United States Patent [19]

Kosuge

[11] 4,391,098
[45] Jul. 5, 1983

[54] TURBO-COMPOUND INTERNAL COMBUSTION ENGINE

[75] Inventor: Hideaki Kosuge, Hayama, Japan

[73] Assignee: Nissan Motor Company, Limited, Yokohama, Japan

[21] Appl. No.: 300,115

[22] Filed: Sep. 8, 1981

[30] Foreign Application Priority Data

Sep. 17, 1980 [JP] Japan ............................. 55-132519

[51] Int. Cl.³ ............................................. F02B 37/00
[52] U.S. Cl. ........................................ 60/602; 60/605; 60/624
[58] Field of Search ............... 60/600, 601, 602, 603, 60/605, 624

[56] References Cited

U.S. PATENT DOCUMENTS

| 2,173,595 | 9/1939 | Schutte | 60/624 |
| 2,245,163 | 6/1941 | Smith | 60/602 |
| 3,007,302 | 11/1961 | Vincent | 60/605 |
| 3,906,729 | 9/1975 | Connor | 60/602 |
| 4,100,742 | 7/1978 | Harp, Jr. | |

FOREIGN PATENT DOCUMENTS 2855687 6/1979 Fed. Rep. of Germany .
53-093598 7/1978 Japan .

OTHER PUBLICATIONS

Automotive Engineering, vol. 86, No. 8, Aug. 1978, "Using Waste Heat Boosts Diesel Efficiency", pp. 84–94.
Automotive Engineering, vol. 87, No. 1, Jan. 1979, "From Racetrack to Roadway", pp. 46–51.

Primary Examiner—Douglas Hart
Attorney, Agent, or Firm—Schwartz, Jeffery, Schwaab, Mack, Blumenthal & Koch

[57] ABSTRACT

First and second waste gates respectively control the supercharging pressure of an engine supercharger and the pressure fed to an auxiliary turbine from the engine turbo-charger turbine. The scroll of the auxiliary turbine is divided by a partition into first and second passages which respectively receive the exhaust gases bypassed by the first waste gate and the exhaust gases from the turbo-charger turbine. The first waste gate prevents over pressurization of the engine cylinders while the second prevents the build up of excessive back pressure downstream of the turbo-charger turbine, thus maintaining the efficiency and torque output of the engine while still deriving benefit from the operation of the auxiliary turbine.

4 Claims, 5 Drawing Figures

TURBO-COMPOUND INTERNAL COMBUSTION ENGINE

BACKGROUND OF THE INVENTION

1. Field of the Invention

The present invention relates generally to an internal combustion engine and more particularly to an internal combustion engine having a turbo-charger and an auxiliary turbine which is driven by the exhaust gases flowing from the turbo-charger and integrated with the crankshaft of the engine for increasing the power output thereof.

2. Brief Description of the Prior Art

In a previously proposed arrangement such as schematically illustrated in FIG. 1 of the drawings, an auxiliary turbine 1 has been geared to the crankshaft 2 of an internal combustion engine 3 (or auxiliary equipment such as oil pumps etc.) and fed hot expanding exhaust gases from a turbine 4 of a turbo-charger 5 so as to utilize the surplus energy remaining in the exhaust gases and increase the power output of the engine 3, either by adding directly to the engine output through the crankshaft 2 or by reducing the amount of power that must be supplied by the engine to the various auxiliary units attached to the engine (e.g. air conditioning compressors or the like).

In order to control the operation of this arrangement, it has been necessary to provide a waste gate 6 (see FIG. 2) which controls the supercharging pressure by by-passing some of the exhaust gases normally fed to the turbo-charger turbine 4 around same, to the auxiliary turbine 1 geared to the engine crankshaft 2 (or the like).

However, this arrangement has suffered from the drawback in that, as the back pressure prevailing downstream of the turbo-charger turbine 4 varies with the rotational speed of the auxiliary turbine 1 and the amount of exhaust gas by-passed around the turbo-charger turbine, excessive back pressure tends to occur. This excessive back pressure of course undesirably inhibits optimal engine performance the variation of the back pressure and renders it very difficult to match the operation of the turbo-charger and the auxiliary turbine.

SUMMARY OF THE INVENTION

The present invention features an internal combustion engine having a turbo-charger and an auxiliary turbine integrated with the crankshaft of the engine, for increasing the power output of the engine wherein a combination of waste gates (a) by-pass exhaust gases from the combustion chamber around the turbine of the turbo-charger and direct the by-passed exhaust gases to the auxiliary turbine and (b) by-pass exhaust gases emitted from the turbo-charger turbine around the auxiliary turbine to prevent the build-up of excessive back pressure downstream of the turbo-charger turbine. This double waste gate control system is further combined with "double entry" (dual) scroll arrangement in which two separate passages are formed, and which passages serve to separately direct the exhaust gases bypassed around the turbo-charger turbine and the exhaust gases discharged from the turbine itself, against the blades of the auxiliary turbine.

With this arrangement, it is possible to smoothly direct the exhaust gases in each of the passages defined within the scroll against the blades of the auxiliary turbine with the optimal angle of incidence thereon and with the minimum of interference and diffusion between the respective flows.

BRIEF DESCRIPTION OF THE DRAWINGS

The features and advantages of the arrangement of the present invention will become more clearly appreciated from the following description taken in conjunction with the accompanying drawings in which.

DETAILED DESCRIPTION OF THE PREFERRED EMBODIMENT

Figure 1:
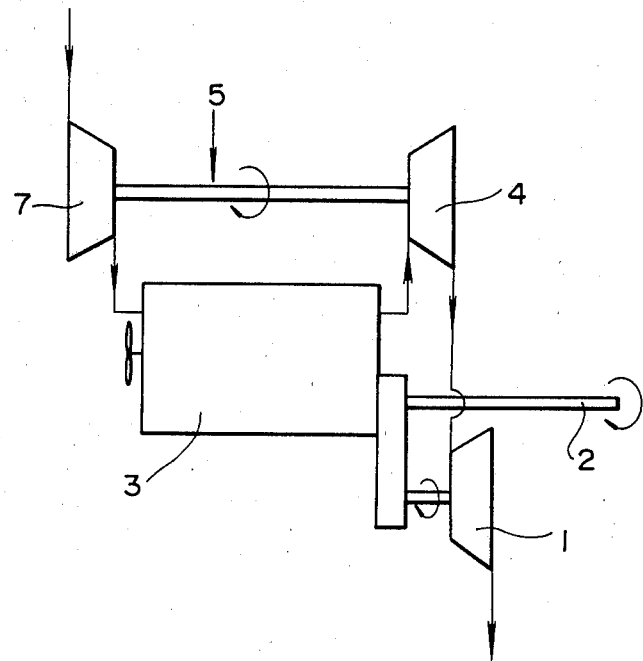
FIG. 1 is a schematic illustration of a prior art turbo compound engine.
Figure 2:
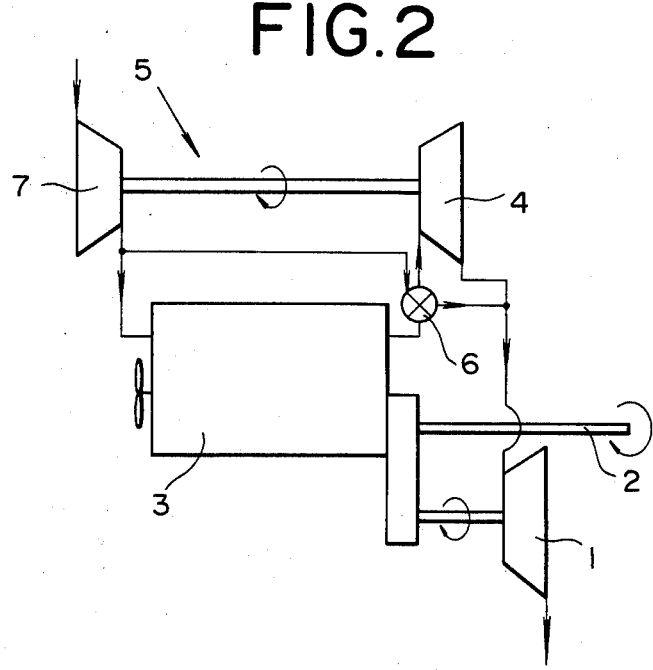
FIG. 2 is a schematic illustration similar to FIG. 1 showing the provision of a prior art waste gate in the arrangement shown in FIG. 1.
Figure 3:
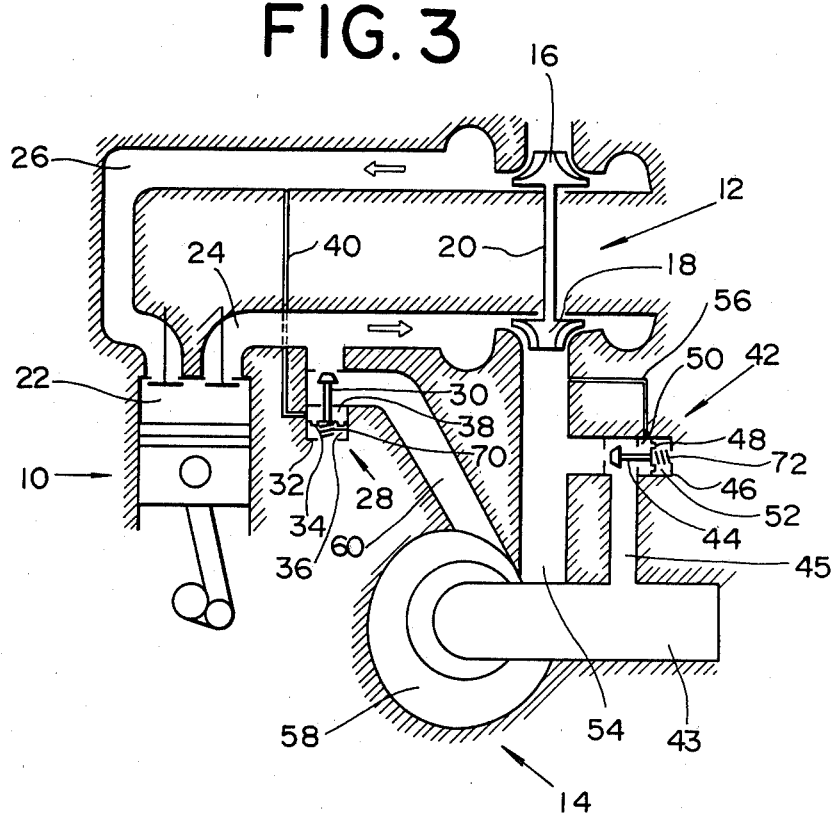
FIG. 3 is a schematic section of a preferred embodiment of the present invention.
Figure 4:
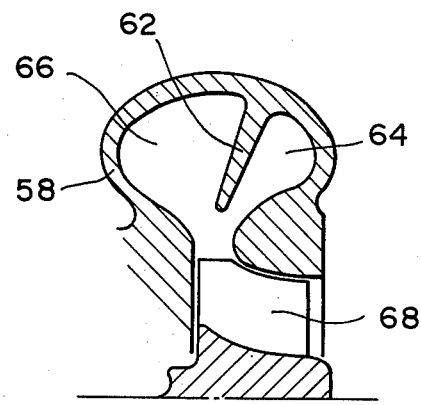
FIG. 4 is a sectional view of a dual passage scroll utilized in the auxiliary turbine of the preferred embodiment.
Figure 5:
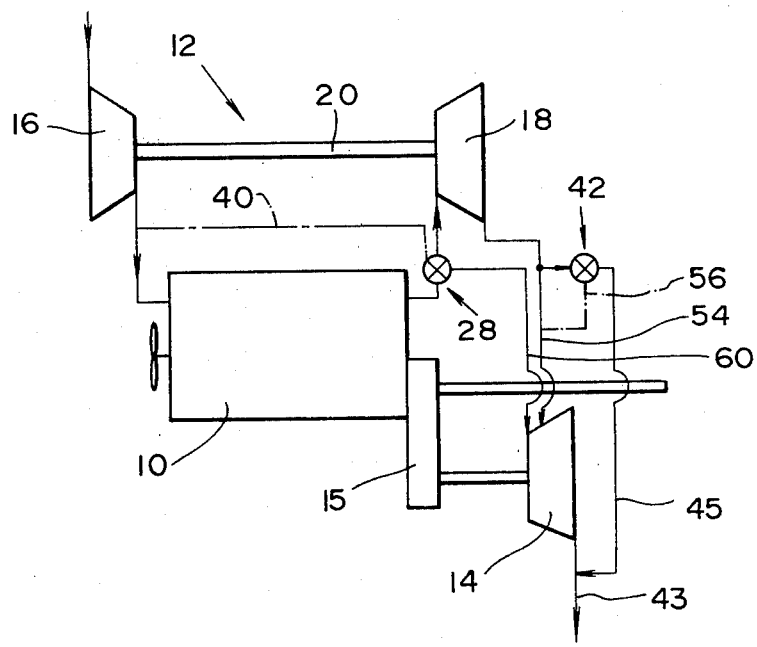
FIG. 5 is a schematic illustration of the preferred embodiment of the present invention.

Turning now to the drawings and more specifically to FIGS. 3 to 5, a preferred embodiment of the invention is shown. In this embodiment an internal combustion engine 10 is equipped with both a turbo-charger 12 and an auxiliary turbine 14. In this case the auxiliary turbine 14 is geared to the crankshaft 11 of the engine 10 through a combination of a reduction gear and an over-running clutch (which allows the engine to outrun the auxiliary turbine without driving same) 15.

As shown in FIG. 3 the turbo-charger has a compressor 16 which is drivingly connected to a turbine 18 by a drive shaft 20. The turbine 18 is driven by the hot exhaust gases emitted from the combustion chamber 22 of the engine 10 and which are directed thereto through an exhaust passage 24.

To control the supercharging pressure prevailing in the induction passage 26 leading from the turbo-charger compressor 16 to the combustion chamber 22, a first waste gate or by-pass 28 is provided in the exhaust passage 24. This waste gate takes the form of a valve 30 operated by a pressure differential responsive motor 32. This motor includes a diaphragm 34 which hermetically separates an atmospheric chamber 36 and a pressure chamber 38. The pressure chamber 38 fluidly communicates with the induction passage 26 through a passage or conduit 40.

A second waste gate or by-pass 42 is also provided downstream of the turbo-charger turbine 18 for relieving, via a by-pass passage 45, any excess back pressure which may develop between said turbine 18 and the auxiliary turbine 14, into an exhaust conduit 43 communicating with the discharge side of the auxiliary turbine 14. This second waste gate 42 like the first, includes a valve 44 which is operated by a pressure differential responsive motor 46. This motor also has a diaphragm 48 which hermetically divides a pressure chamber 50 and an atmospheric chamber 52. In this case the pressure chamber 52 is fluidly communicated with a transfer passage 54 interconnecting the turbine 18 and the auxiliary turbine 14 via a conduit or passage 56.

The auxiliary turbine 14 is provided with a "double entry" (dual) scroll 58 which is adapted to separately receive both the exhaust gases from the first waste gate via by-pass passage 60 and the exhaust gases from the turbo-charger turbine 18 through passage 54. To this end the scroll is provided with a partition 62 which divides the scroll into two asymmetrical passages 64, 66 which respectively communicate with passages 60 and 54. As shown in FIG. 4 the cross-section and configuration of each passage is different and so selected as to direct the respective flows passing therethrough, toward the blades 68 of the auxiliary turbine so as to impinge thereon with the optimal angle of incidence. Further, due to the separation of the two flows the pulsations in each, do not interfere with each other and thus do not induce any filling and emptying losses or the like.

In operation, when the engine is operating at low speed and low load conditions, the first waste gate 28 is closed due to the lack of sufficient pressure in the pressure chamber 38 to overcome the combined bias of the atmospheric pressure and the spring 70 in the atmospheric chamber 36. The second waste gate 42 is also closed at this time, so that substantially all of the exhaust gases discharged from the combustion chamber 22 are directed through the turbo-charger turbine 18 and transfer passage 54 via turbine 14 into the exhaust conduit 43. As the rotational speed of the auxiliary turbine 14 is relatively low under these conditions, the back pressure developed downstream of the turbo-charger turbine 18 is relatively low, thus allowing for a high expansion rate across same, which induces an according high supercharging pressure in the induction passage 26 and in turn increases the torque output of the engine 10 under these conditions.

When the supercharging pressure reaches a predetermine level (for example 300–1800 mm Hg) the first waste gate is opened, viz., when the supercharging pressure (or compressor 16 discharge pressure) has reached a level sufficient to overcome the bias of the spring 70 and atmospheric pressure in the atmospheric chamber 36, a portion of the exhaust gases discharged from the engine is thus allowed to flow through the by-pass passage 60 into the scroll passage 64 and subsequently to the auxiliary turbine. The remaining portion of the exhaust gases of course continues to flow through the turbine 18, conduit 56 and passage 66 to the auxiliary turbine.

When the engine operates at high speed high load, the amount of exhaust gases by-passed through the by-pass passage 60 is relatively large, increasing the rotational speed of the auxiliary turbine. This increase of rotational speed is also accompanied by an increase in inlet pressure of the auxiliary turbine and accordingly, the back pressure acting on the turbo-charger turbine 18 increases and tends to reduce the expansion ratio thereacross to the point of reducing the thermal efficiency of the engine 10. At this time the second waste gate 42 opens, the pressure prevailing in the transfer passage 54 being transmitted to the pressure chamber 50 of the pressure differential motor 46, overcoming the bias of the spring 72 and the atmospheric pressure in the atmospheric chamber 52 thereof. The opening of the second waste gate 42 allows the excessive back pressure to be relieved into the exhaust conduit 43 via the passage 54, thus preventing an inevitable engine torque output reduction by reducing the back pressure acting on the turbo-charger turbine 18. Simultaneously, the auxiliary turbine adds to the engine output via the supply of exhaust gases thereto through both of the passages 54 and 60.

What is claimed is:

1. In a engine system including a internal combustion engine equipped with a turbo-charger and an auxiliary turbine integrated with said engine, the combination comprising:

an exhaust passage leading from a combustion chamber of said engine to a turbine of said turbo-charger;

a transfer passage leading from the turbo-charger turbine to a scroll of said auxiliary turbine;

a first by-pass passage leading from said exhaust passage to said scroll;

a second by-pass passage leading from said transfer passage to an exhaust conduit of said engine;

a first waste gate responsive to the discharge pressure of a compressor of said turbo-charger which controls the communication between said exhaust passage and said first by-pass passage, said first waste gate being adapted to open upon the discharge pressure of said turbo-charger compressor reaching a first predetermined value;

a second waste gate responsive to the pressure prevailing in said transfer passage which controls the communication between said second by-pass passage and said transfer passage, said second waste gate being adapted to open upon a second predetermined pressure prevailing in said transfer passage; and means defining first and second passages within said scroll which exclusively communicate with said first by-pass passage and said transfer passage, respectively.

2. A combination as claimed in claim 1, wherein said first waste gate comprises a first valve and a first pressure differential responsive motor which has a first atmospheric chamber and a first pressure chamber, said first pressure chamber fluidly communicating with an induction passage leading from said compressor to said combustion chamber.

3. A combination as claimed in claim 1, wherein said second waste gate includes a second valve and a second pressure differential responsive motor which has a second atmospheric chamber and a second pressure chamber, said second pressure chamber fluidly communicating with said transfer passage.

4. A combination as claimed in claim 1 wherein said first and second passage defining means is a partition formed within said scroll, and wherein said first and second passages are so shaped as to direct the exhaust gases flowing therein against blades of said auxiliary turbine with the optimal angle of incidence and with the minimum of interference between the respective flows.

* * * * *